Patented Feb. 20, 1945

2,369,718

UNITED STATES PATENT OFFICE 2,369,718

CONCENTRATION OF VISCOSE

Francis B. Cramer, Waynesboro, Va., assignor to E. I. du Pont de Nemours & Company, Wilmington, Del., a corporation of Delaware No Drawing. Application November 30, 1943, Serial No. 512,338

3 Claims. (Cl. 260—218)

This invention relates to the dehydration of viscose to produce solutions of high cellulose and high caustic content.

For certain purposes, a viscose of high cellulose content is desired, as for instance, in making heavy-walled tubing, heavy-gauge film or heavy monofils of regenerated cellulose by the viscose process. When ordinary viscose solutions are used for producing such products, the high percentage of water that must be removed during coagulation and/or regeneration causes excessive shrinkage and requires especially long coagulating and regenerating treatments to insure complete reaction throughout the relatively thick structure. Attempts to produce viscose having a high concentration of cellulose, such as 15% or more, by direct solution of cellulose xanthate have never been practical because the dispersion obtained could not be filtered or extruded in the form of usable products. Proposals have also been made before to dehydrate normal viscose solutions, but either the economics of the process or the quality of the resulting viscose solutions obtained thereby have been such as to offer no commercial utility.

Therefore, the principal object of the invention is to provide a method for removing substantial quantities of water from viscose solutions without deleteriously affecting the cellulose xanthate contained therein and while maintaining a clear, filterable solution suitable for conversion into regenerated cellulose products. Other objects will be apparent from the discussion that follows.

The above stated object is realized by my invention which comprises mixing with normal viscose a water-miscible organic liquid in sufficient quantity to effect separation of a layer comprised of the organic liquid and water, which is easily removed, such as by decantation. The steps of mixing, resting and decanting may be repeated a number of times, depending on the degree of concentration of cellulose desired in the final viscose.

The following water-miscible organic liquids are suitable for the purposes of my invention: isopropanol, butyl carbitol, acetone, diacetone alcohol, dioxane, dimethoxy tetraglycol, glyoxal tetramethyl acetal, and pyridine. Of these liquids, pyridine is preferred for the reason that, in addition to being an efficient dehydrating agent for normal viscose solutions, pyridine is the only liquid of the group which does not, in admixture with water, dissolve out a portion of the caustic content of the viscose solution treated.

The most effective water-miscible organic liquids have been found to be miscible with the viscose solution when added thereto in small amounts, for instance in amounts less than 20% by weight. However, when used in larger amounts, for example 50% or more by weight, the more effective dehydrating reagents of this invention are substantially completely immiscible and it is thus possible to obtain a sharp separation of the aqueous organic liquid layer from the viscose which retains little or none of the organic liquid. It is indeed surprising that substantially complete removal of the organic liquid from the viscose is possible in view of the fact that when smaller amounts are used, i. e. less than 20%, no separation of the organic liquid from the viscose takes place. Accordingly, it is generally desirable to mix with the viscose the caustic-insoluble, water-miscible organic liquid to the extent of at least 40% by weight of the original viscose solution and proportions in the range of from 50% to 100% by weight of the original viscose solution prior to decantation are preferred.

This process may be carried out at room temperature or below and, therefore, the normal ripening rate of the viscose need not be altered. However, if desired, the process may be carried out at above room temperature.

The following specific examples are given to further illustrate the invention. Parts are by weight unless otherwise indicated.

Example I

To 30 parts of viscose containing 7% cellulose and 6% NaOH and ripened to a salt index of about 5.0 are added, with stirring, 20 parts of pyridine. The resulting mix was allowed to settle and separated into two layers. The supernatant liquid was then carefully decanted off and was found to consist of pyridine and about 30% of the water originally contained in the viscose. No caustic was detected in the extract. The viscose had been concentrated to a solution containing about 9.5% cellulose and about 8.2% NaOH.

By mechanically working (e. g., by agitating) the viscose layer after the first extract has been decanted off, it is possible to cause further quantities of the aqueous extract to separate from the viscose solution. The additional extract obtained was probably in pockets and droplets which did not rise through the concentrated viscose because of its high viscosity and the small difference in the densities of the two liquids.

*Example II*

To 30 parts of viscose such as used in Example I are added 20 parts of dimethoxy tetraglycol (dimethyl ether of tetraethylene glycol) and thoroughly mixed. Subsequently, after resting for a few minutes, the supernatant liquid was decanted off and was found to be about 33 parts. In other words, about 50% of the water originally contained in the viscose was removed by this single extraction, while the caustic removal was only to the extent of about 20%. The resulting viscose had been concentrated to a solution containing about 12.3% cellulose and about 8.5% NaOH.

By the process of this invention, viscose can be prepared having a cellulose content substantially above 10% and even above 15%, which enables it to be used to greater advantage in either the wet or dry process for forming products. For instance, this viscose of high cellulose content may be extruded to form film, sausage casings, bands or other tubings, ribbons, filaments, yarns and the like. It may also be used to advantage in the preparation of molded articles.

As many apparently widely different embodiments of this invention may be made without departing from the spirit and scope thereof, it is to be understood that the invention is not limited to the specific embodiments thereof except as defined in the appended claims.

I claim:

1. A process for the concentration of viscose which comprises mixing with the viscose to be concentrated at least 20% by weight of pyridine, based on the weight of the viscose, allowing the mixture to stratify into a layer of pyridine and water and a layer of viscose, and thereafter removing the layer of pyridine and water from the layer of viscose.

2. A process for the concentration of viscose which comprises mixing with the viscose to be concentrated pyridine in an amount of at least 40% by weight based on the weight of the viscose, allowing the mixture to stratify into a layer comprising pyridine and water and a layer of viscose, and thereafter removing the layer of pyridine and water from the layer of viscose.

3. A process for the concentration of viscose which comprises mixing with the viscose to be concentrated from 50% to 100% of pyridine by weight based on the weight of the viscose, allowing the mixture to stratify into a layer comprising pyridine and water and a layer of viscose, and thereafter removing the layer of pyridine and water from the layer of viscose.

FRANCIS B. CRAMER.